July 26, 1966     B. LORENZ ETAL     3,262,220
MECHANICS OF CORIOLIS-DEMONSTRATOR
Filed Jan. 10, 1964     4 Sheets—Sheet 1
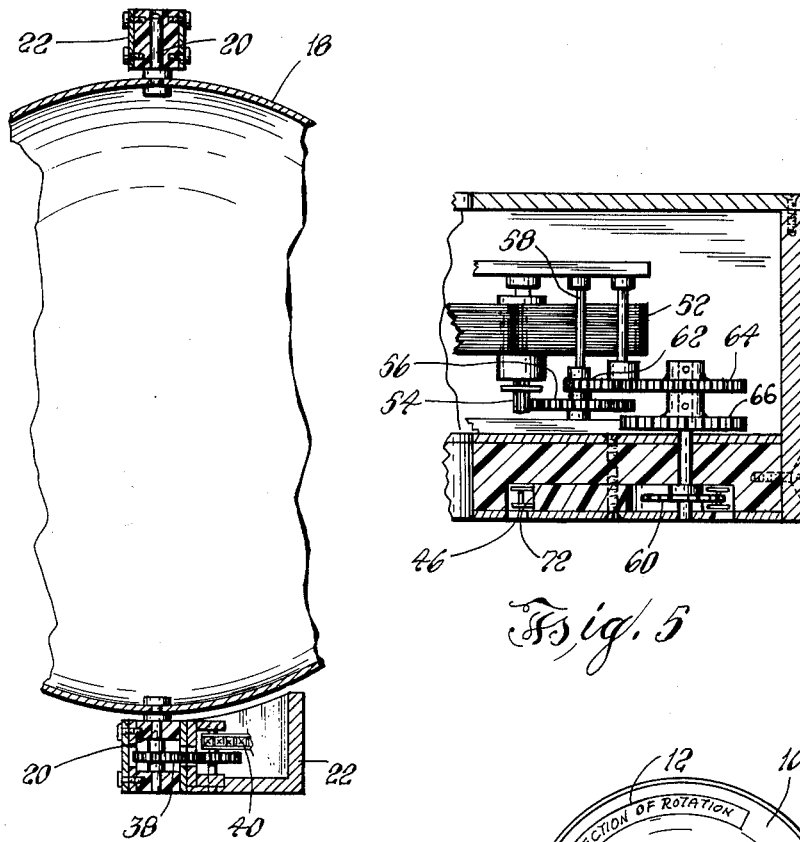
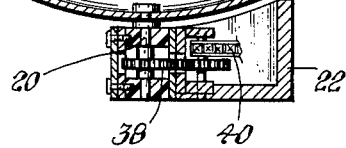
Fig. 6
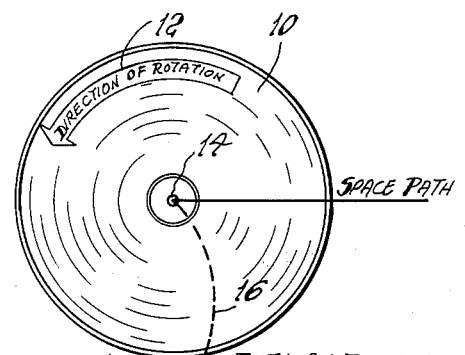
Fig. 1
INVENTORS.
BEN LORENZ
DALTON SHIMKO
ROBERT WYENER
BY
Lawrence S. Epstein
ATTORNEY INVENTORS.
BEN LORENZ
DALTON SHIMKO
ROBERT WYENER
BY
Laurence S. Epstein
ATTORNEY July 26, 1966 B. LORENZ ETAL 3,262,220
MECHANICS OF CORIOLIS-DEMONSTRATOR
Filed Jan. 10, 1964 4 Sheets-Sheet 4

INVENTORS.
BEN LORENZ
DALTON SHIMKO
ROBERT WYENER
BY

Lawrence S. Epstein
ATTORNEY

United States Patent Office 3,262,220
Patented July 26, 1966

3,262,220
MECHANICS OF CORIOLIS-DEMONSTRATOR
Ben Lorenz, Katonah, N.Y., Dalton L. Shimko, Vernon, N.J., and Robert L. Wyener, Woodside, N.Y., assignors, by direct and mesne assignments, to the United States of America as represented by the Secretary of the Navy
Filed Jan. 10, 1964, Ser. No. 337,109
4 Claims. (Cl. 35—46)

This invention relates to a training device and is particularly concerned with demonstrating and teaching the effects of Coriolis force on the earth's atmosphere.

There are a number of forces that operate to move air across the surface of the earth. These consist of gravity, pressure, gradient, Coriolis force, friction, and centrifugal force. In teaching the action of these forces to pilots or meteorologists, instructors have been able to illustrate most of the forces with the exception of the Coriolis force. For the average student, it is difficult to visualize the action of the Coriolis effect from a mere description or diagrammatic illustration thereof. Attempts to visually depict the force of wind have been made before. For example, previous devices provided a globe to show the direction of the winds and the use of arrows to indicate the direction of wind flow. Other forms provided a geographic globe having arcuately-shaped rods supported at the poles and curved bands in the shape of air currents. These were utilized to indicate the direction of flow of the air currents. However, none of these structures illustrated and taught the effects of Coriolis force.

Thus, the problem of understanding the theory of general circulation of air capable of accounting for the major features of wind and weather is one of the most difficult questions in meteorology. It is known that the equatorial regions receive more solar energy than do the polar areas. Also, at the equator, the radiational heat gain is greater than the radiational heat losses, while the reverse is true at the poles. Thus, if radiation were the only factor, the equatorial regions would become increasingly warmer and the polar regions would become increasingly colder. However, there are mechanisms existent which equalize the heat excesses and deficiencies. One of these is the North-South movement of air. If the circulation of this air took place on a uniform non-rotating earth, the heating at the equator would cause the air at the lower levels to expand upwards and the cooling at the poles would cause the air at the lower levels to contract. Thus, there would be a differential in pressure. Because the pressure at the poles is lower, the air from the equator would then move towards the poles. This movement results in a rise at the sea level pressure at the pole and a reduction at the equator, since the sea level pressure is a measure of the weight of the air above sea level. The pressure gradient would then result in a southward flow of air in the lower levels. As is evident from FIG. 2, the travel of air in the northern hemisphere is depicted by the arrows Y and the travel of air in the southern hemisphere is depicted by the arrows Z. This would be true on a uniform, non-rotating earth. However, since the earth rotates, the air does not travel in this uniform manner and is affected by the other forces mentioned above, of which the Coriolis force will be demonstrated. This Coriolis force is brought about by the rotating action of the earth. This apparent force causes a deflection of the wind to the right in the northern hemisphere and to the left in the southern hemisphere. The theory of the Coriolis force is illustrated schematically in FIG. 1. Imagine that the disc 10 is a record player and the path of rotation is as depicted at 12. Then, with the use of a ruler and a piece of chalk a "straight" line from the center 14 of the turntable to the outside edge is drawn. To the person drawing the line, the chalk traveled in a straight path. If the record 10 is then stopped, the line on the record will not be straight, but will be curved as indicated by the dotted line 16. It is this apparent force which is called the Coriolis force. This apparent force is strongest at the poles and decreases to zero at the equator. It also varies with the wind speed so that as the speed increases, the Coriolis force increases. Thus, as the air moves northward from the equator it is deflected to the right and finally is no longer moving northward but moves from west to east and finally northward to the pole.

The instant device has therefore been designed to illustrate these principles so that a visual effect of the operation of a Coriolis force is now available to the student.

An object of the invention is to provide a visual demonstration of the effects of the Coriolis force on wind on the earth's surface.

Another object is to compare the effects of winds on a rotating earth's surface and on a non-rotating surface.

Yet another object is to illustrate the direction of travel of winds over the earth's surface to illustrate the effect that differences in air pressure will cause cold air to displace warm air and to rise above and flow over the colder air areas.

Other objects and many of the attendant advantages of this invention will be readily appreciated as the same becomes better understood by reference to the following detailed description when considered in connection with the accompanying drawings wherein:

FIG. 1 is a schematic illustration of the Coriolis force on a rotating disc surface, such as a phonograph;

FIG. 5 is a section taken on line 5—5 of FIG. 3 taken at a rotation of 180° and illustrates the gear construction; and FIG. 6 is a vertical, fragmentary section illustrating the rotation of the earth.

Figure 2:
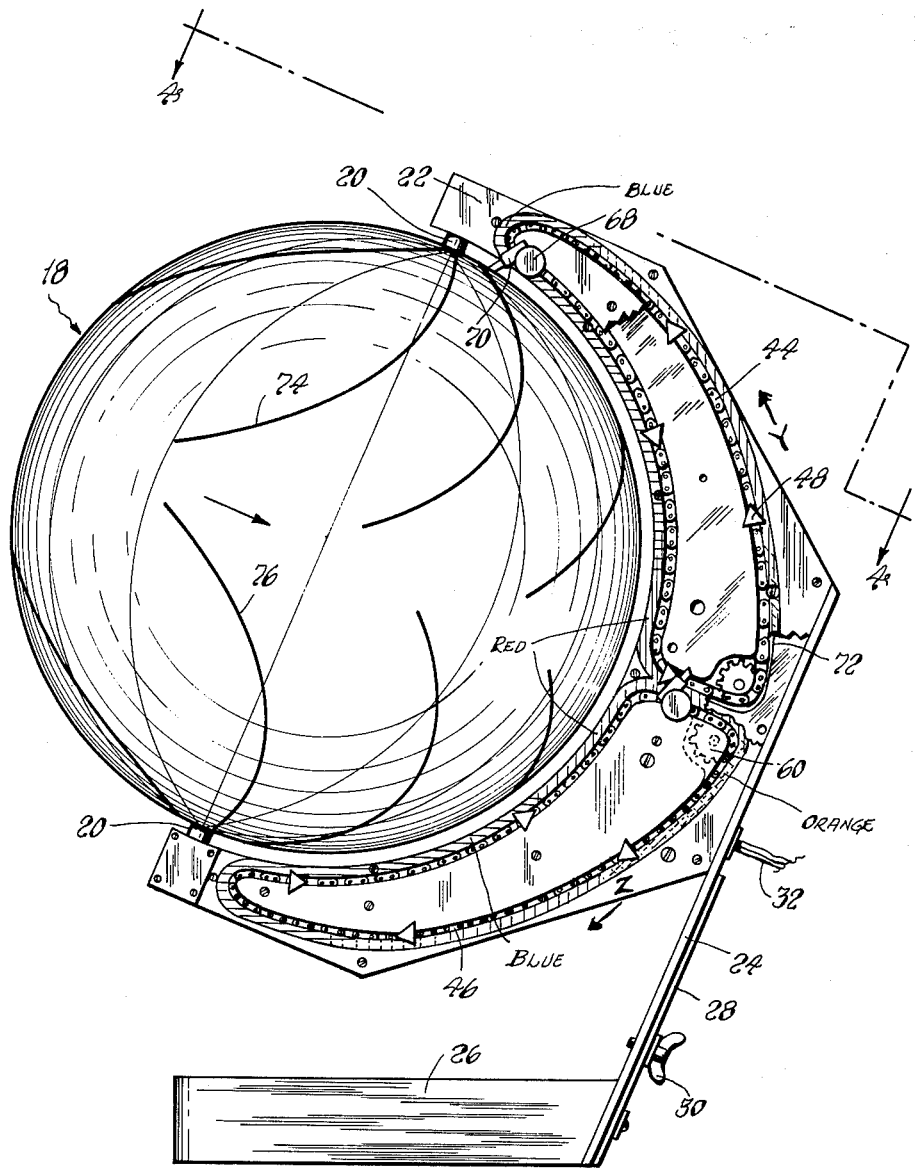
FIG. 2 is an elevation of the invention with the Coriolis effect illustrated.

Referring to the figures, the earth is depicted as a globe 18 and is angularly retained for rotation on the bearings 20. Thus, the axis of rotation of the earth is maintained. The bearings 20 are retained in the housing 22. The housing 22 serves the dual function of supporting the earth globe 18 and the structure illustrating the effects of wind and Coriolis forces. The housing 22 is itself retained on the vertically extended flatplate 24, which is in turn supported on the base member 26. The slotted plate member 28 provides adjustment from a tilt of 23½ degrees to a horizontal position parallel to the base member 26 by means of the wing nut member 30. This closely approximates the position of the earth in relation to its heliocentric rotation. Since this construction is conventional, there need be no further description of its operation. The necessary electrical connections 32 are provided and will be shortly explained.

Figure 3:
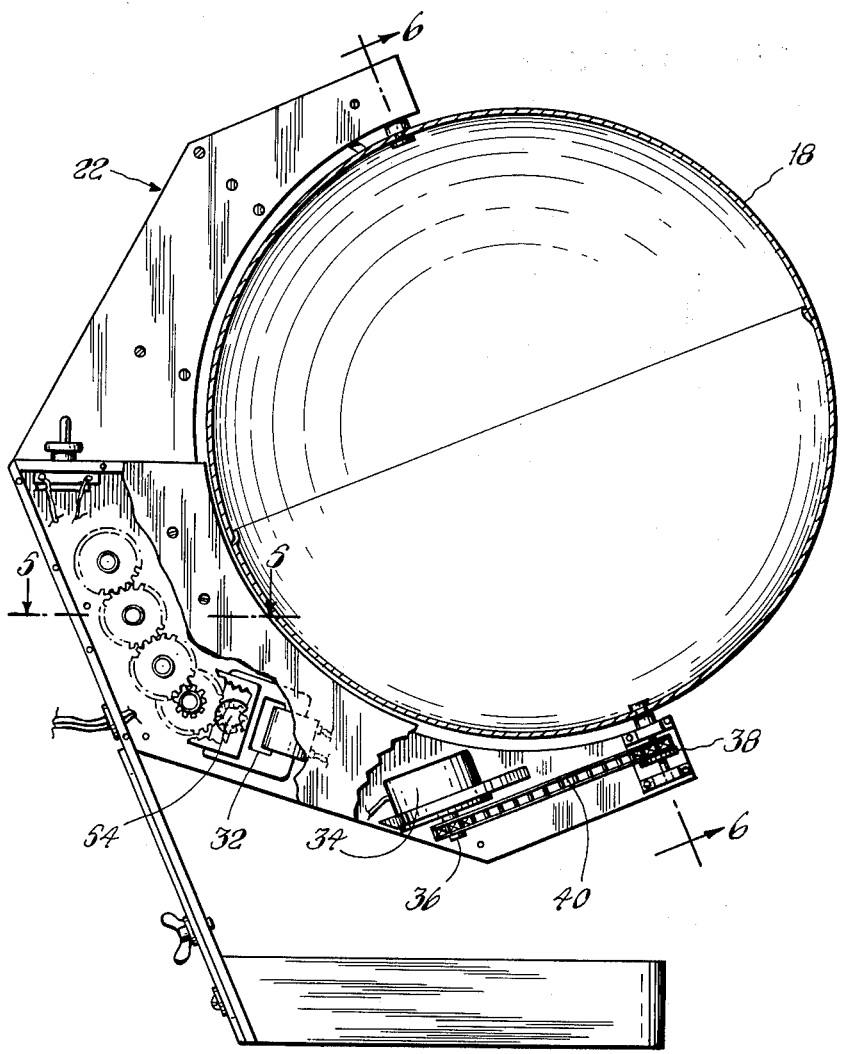
FIG. 3 is an elevation of the invention with parts cut away to illustrate the gear arrangement.
Figure 4:
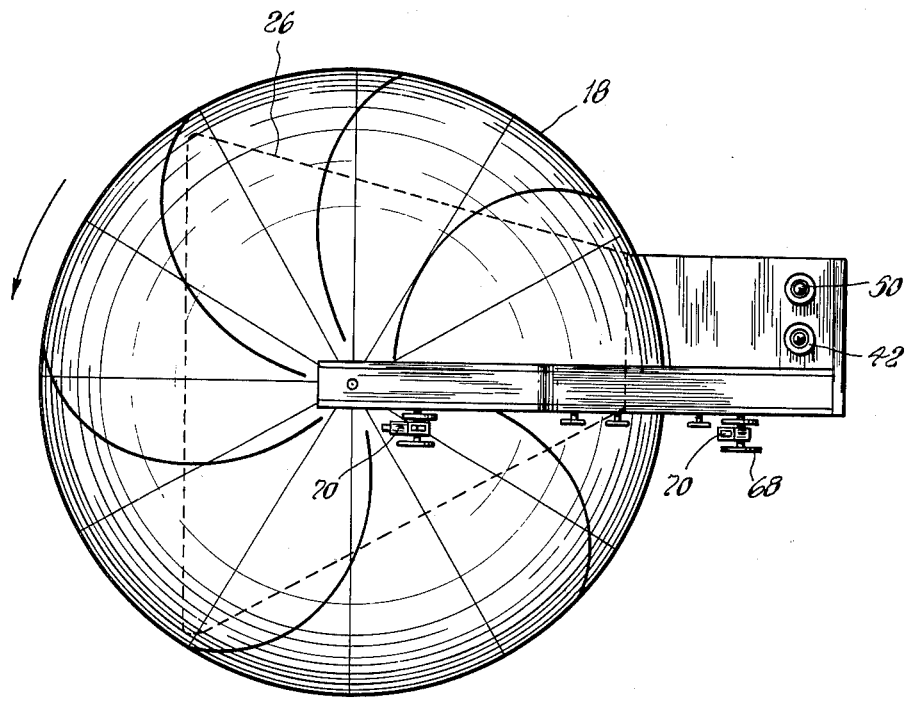
FIG. 4 is a plan view of the invention and is taken from line 4—4 of FIG. 2.

Referring to FIGS. 3, 4 and 6, the rotation of the earth 18 is controlled by the motor 34 carrying the sprocket wheel 36 and the bearings 20 carrying the idler sprocket 38. The sprocket chain 40 actuates the sprocket wheel 38 upon activation when the push button 42 on the housing 22 is depressed. This will cause the earth 18 to rotate slowly in simulation of the rotation of the earth. Actuation of the control button 42 will serve to stop rotation, when desired.

Referring to FIGS. 2, 3 and 5, the movement of air about the surface of the earth is illustrated. The housing 22 retains the endless sprocket chains 44 and 46.

The endless chain belt 44 illustrates the movement of the winds (air masses) in the northern hemisphere and the endless belt 46 illustrates movement of the winds (air masses) for the southern hemisphere. The separate chain drive construction permits the illustration of simultaneous movement of these winds' (air masses) forces. Mounted on the endless sprocket chains 44 and 46 are the directional arrows 48 to aid in further visibly illustrating the direction of the flow of the winds over the earth's surface. As is best illustrated in FIGS. 3, 4 and 5, the sprocket chain push button 50 is depressed to actuate the motor 52. Energizing of the motor 52 rotates the drive wheel 54 to engage the gear member 56 mounted on the shaft 58. This causes the shaft 58 to rotate on the idler pinion 60 (see FIG. 2) and to thereby drive the sprocket member 46. A second gear member 62, mounted on the shaft 58 engages the gear member 64 to in turn rotate the idler pinion member 66. The idler pinion member 66 engages the pinion 60 to operate the sprocket member 46. A gear (not shown) is actuated by the gear 66 to drive the sprocket member 44, in an opposite direction from the sprocket member 46. Thus, the winds (air masses) are clearly depicted as moving in reverse directions for the northern and southern hemispheres.

A support pin 68 extends transversely on each of the sprocket chains 44 and 46 and retains a marking tool such as a piece of chalk or crayon 70 transversely thereon. Thus, the marking tool 70 is parallel to and in close proximity to the vertical movement of the endless sprocket chain members 44 and 46. When the push button 50 is actuated, and the motor 52 is energized, the rotation of the gears illustrated in FIG. 5 causes the sprocket chain members 44 and 46 to move along the channeled path 72 in the direction of the arrows 48. The marking tool 70 travels along with the sprocket chains 44 and 46 and when it reaches the upper surface of the globe or earth 18 it engages the globe to mark it as long as it travels along the vertical length thereof. The portions of housing 22 adjacent to the path of travel of these endless sprocket chains 44 and 46 are suitably colored to illustrate the types of wind. The cold winds are illustrated in blue adjacent the North and South poles and the progressively warming winds are shown first as orange, and then finally as red, at a joint adjacent the equator. This is used to illustrate the point to the student that the warm winds are near the equator and that as they rise they tend to cool until they are quite cold at the extreme poles.

The device, when in operation, is thus capable of illustrating the effect of winds when the earth is not rotating and particularly the Coriolis effect when the earth is in its normal rotational orbit. Assuming that the earth did not rotate, the warmer air at the equator would circulate uniformly, providing a constant circulation which consists of two circular paths, with warm air rising at the equator, traveling aloft toward the North and South poles, and returning cooled along the earth's surface to the equator. This can be illustrated by the demonstrator of the invention by simply actuating the wind direction push button 50 and not operating the button 42 which controls the rotation of the earth 18. This would cause the marking tool 70 to travel along a vertical path in opposite directions from the equator to the North and South poles, in a single straight line. Imagining an endless series of such marking tools 70, the effect just described could be illustrated. However, as is well known, other forces modify this theoretical pattern. A very important force to so affect this pattern is the rotation of the earth. In the northern hemisphere this rotation causes air to flow to the right of its normal path and in the southern hemisphere, air flows to the left of its normal path. Thus, in further illustrating this Coriolis effect in the northern hemisphere only, as the air rises and moves northward from the equator, it is deflected toward the east and by the time it has traveled about a third of the distance to the pole, it is no longer moving northward, but eastward. This causes the air to accumulate at a belt at a latitude of about 30°, creating an area of high pressure. The air continues aloft in its journey northward, being cooled en route, and finally settles down near the pole where it begins a return trip toward the equator. This is a simplified description of the movement of the air. When the push button 50 is actuated, the gear construction actuating the endless sprocket chains 44 and 46 cause them to move and the marking tool members 70 eventually engage the earth's surface. Since the earth is rotating, the lines shown no longer are in a vertical direction but are moved angularly as is illustrated at 74 and 76 in FIG. 2. The lines 74 depict the Coriolis force in the northern hemisphere while the lines 76 depict the Coriolis force in the southern hemisphere. Thus, for the first time it is now possible for the student or trainee to visually corrolate the effect of Coriolis force on the winds over the surface of the earth as the teacher lectures on this phenomena. The structure of the earth globe 18 is provided with a textured surface, one capable of erasably receiving a marking on its surface such as a china marking pencil or chalk. This is therefore capable of being erased when the lecture has been completed and is able to provide a clean surface for any later lectures to other students. It should be noted that while the wind path illustrated by means of the endless sprocket chain members 44 and 46 are shown in its most simplified form as a single, unitary movement, in actuality, this movement is subdivided into smaller, circulatory movements along the surface of the earth. The structure would therefore be readily modified by providing a plurality of endless belts along the surface of the earth to refine this illustration, without departing from the spirit of the invention.

Obviously many modifications and variations of the present invention are possible in the light of the above teachings. It is therefore to be understood that within the scope of the appended claims the invention may be practiced otherwise than as specifically described.

What is claimed is:
1. A device for simulating the effect upon the earth of air currents comprising,
 a housing,
 a globe member, said globe member simulating the earth's surface and including an equator and North and South poles,
 means in said housing retaining said globe member,
 simulated wind movement means in said housing and adjacent the globe member, said simulated wind movement means comprising,
 an endless chain member,
 said endless chain member being wider at a point adjacent the globe equator and narrower adjacent the North pole to illustrate the direction of air currents,
  actuating means engaging and adapted to move said simulated wind movement means,
 and said actuating means comprising a motor and sprocket drive means to rotate said endless chain member,
 and marking means on said simulated wind movement means engaging said globe member whereby direction of movement of air currents on the earth's surface is illustrated.
2. The combination of claim 1 wherein said marking means comprises,
 a support pin secured on said chain member, and
 a marking tool extending from said support pin and engaging the globe member to mark a path of travel of the air currents along the earth's surface.
3. A device for simulating the effect upon the earth of air currents comprising,
 a housing, a globe member, said globe member simulating the earth's surface and including an equator and North and South poles,
means in said housing retaining said globe member,
said globe retaining means being angularly inclined in simulation of the axis of the globe,
simulated wind movement means in said housing and adjacent the globe member,
actuating means engaging and adapted to move said simulated wind movement means,
marking means on said simulated wind movement means engaging said globe member whereby direction of movement of air currents on the earth's surface is illustrated,
means in said housing operatively rotating said globe member to simulate the rotation of the earth, said operatively rotating means comprising,
a motor,
bearing means extending from said globe member,
an endless sprocket chain connecting said motor and bearing means to rotate the globe member, the marking means thereby moving along the globe member as it rotates to simulate the Coriolis force effect, and
an endless chain member,
said endless chain member being wider at a point adjacent the globe equator and narrower adjacent the North pole to illustrate the direction of air currents,
and said drive means comprises a motor and sprocket drive means to rotate said endless chain member.

4. The combination of claim 3 and
a support pin secured on said chain member, and
a marking tool extending from said support pin and engaging the globe member to mark a path of travel of the air currents along the earth's surface.

References Cited by the Examiner

UNITED STATES PATENTS

| | | | |
|---|---|---|---|
| 333,971 | 1/1886 | Royall | 35—46 |
| 1,175,612 | 3/1916 | Cresse | 33—1.5 X |
| 1,207,868 | 12/1916 | Craighead | 35—46 |
| 2,105,619 | 1/1938 | Smith | 35—46 |
| 2,158,368 | 5/1939 | Hurt | 35—29 |
| 3,028,687 | 4/1962 | Johnson | 35—46 |

EUGENE R. CAPOZIO, *Primary Examiner.*

H. S. SKOGQUIST, *Assistant Examiner.*